(12) United States Patent
Bogacz et al.

(10) Patent No.: US 7,821,735 B1
(45) Date of Patent: Oct. 26, 2010

(54) APPARATUS AND METHOD FOR SEALING A HARD DRIVE ENCLOSURE

(76) Inventors: Chad A. Bogacz, 13900 Lake Song La., B3, Broomfield, CO (US) 80020; David D. Brause, 1373 Clemson Dr., Longmont, CO (US) 80503; Brian L. Rappel, 1043 Kiowa Rd., Lyons, CO (US) 80540

( * ) Notice: Subject to any disclaimer, the term of this patent is extended or adjusted under 35 U.S.C. 154(b) by 940 days.

(21) Appl. No.: 11/385,574

(22) Filed: Mar. 20, 2006

(51) Int. Cl.
*G11B 33/14* (2006.01)
(52) U.S. Cl. .................................... 360/97.02
(58) Field of Classification Search ............... 360/97.01
See application file for complete search history.

(56) References Cited

U.S. PATENT DOCUMENTS

| | | | |
|---|---|---|---|
| 5,270,887 A | 12/1993 | Edwards et al. | |
| 5,404,257 A | 4/1995 | Alt | |
| 6,011,670 A * | 1/2000 | Balsley et al. | 360/97.01 |
| 6,034,841 A * | 3/2000 | Albrecht et al. | 360/97.01 |
| 6,411,463 B1 * | 6/2002 | Janik et al. | 360/97.01 |
| 7,102,850 B1 * | 9/2006 | Buzek et al. | 360/97.01 |
| 2002/0149875 A1 * | 10/2002 | Dague et al. | 360/97.01 |

* cited by examiner

Primary Examiner—David D Davis
(74) Attorney, Agent, or Firm—Workman Nydegger

(57) ABSTRACT

A disk drive housing, base assembly for use as part of the housing and associated method are disclosed. The base assembly is configured for receiving a cover. In one feature, a base housing serves to define a housing interior in cooperation with the cover for receiving a plurality of components therein as part of the disk drive and the base housing includes a peripheral edge configuration. A molding surrounds and sealingly engages the base housing such that the molding defines a peripheral sealing surface for use in sealing the cover to the base assembly. In another feature, accommodating one or more given components within a given base housing outline, which would not otherwise be accommodated, is described by outsetting a peripheral sidewall of the base housing, adjacent to the given component.

26 Claims, 4 Drawing Sheets

APPARATUS AND METHOD FOR SEALING A HARD DRIVE ENCLOSURE

BACKGROUND OF THE INVENTION

The present invention is related generally to the field of disk drives and, more particularly, to a disk drive enclosure and associated method.

Enclosures for disk drives satisfy a number of operational requirements which are somewhat more stringent, for example, in the instance of a hard disk drive. With respect to the latter, the enclosure is generally composed of two major parts. Specifically, a base portion of the enclosure is often used to support the various components that make up the drive including at least one disk that is supported for rotation and an actuator arrangement for use in performing data accesses to and from the disk. The base portion of the enclosure is generally configured to receive a cover to cooperate therewith in defining an enclosure interior. The cover portion is generally sealed to the base portion in order to protect the components of the drive from environmental concerns such as, for example, contamination.

One approach that has been taken with respect to sealing a cover to a base is exemplified by U.S. Pat. No. 5,270,887 (hereinafter the '887 patent). The latter describes a cover and base, with the latter described as preferably being die cast, each of which define a sidewall. With the cover and base in an engaged position, the sidewalls align in a way which provides for applying a tape seal that bridges a gap between the cover and base sidewalls to provide a seal therebetween. Unfortunately, it is considered that such an approach requires fairly accurate registration between the cover and base and is not well-suited for use in modern small form factor drives.

In a related approach, the prior art has utilized a cover which is generally planar, defining a major outermost surface with essentially no sidewalls. With the cover received on the base, a sealing tape is applied against at least a peripheral portion of the major surface of the cover and the base sidewall such that the tape bridges a corner of the overall enclosure arrangement that is cooperatively defined by the cover and base.

A more recent approach, with respect to sealing the cover portion to the base portion, is diagrammatically illustrated by FIG. 1. The latter is a cut-away diagrammatic illustration of one corner of a hard drive housing that is generally indicated by the reference number 10. Drive housing 10 includes a base 12 and a cover 14. Base 12 is made up of a number of components including a metallic base plate 20 that is thought to be formed by stamping so as to define a peripheral step 22 that extends inwardly to a peripheral sidewall which is not visible in the present view. The peripheral sidewall is surrounded by a molding 24 in a manner which leaves an outer edge and upper surface region of peripheral step 22 exposed. Cover 14 is received by base portion 12 such that an upper surface of the cover is generally coplanar with the exposed upper surface of step 22 so as to define a peripheral gap 30 between step 22 and a peripheral edge of cover 14. In order to seal this cover and base arrangement, a sealing tape 32 is applied so as to bridge gap 30. It is noted that a portion of the sealing tape has been cut-away in the present illustration so as to illustrate the relationship between base 12 and cover 14, including gap 30. Unfortunately, it is considered that a number of concerns may be associated with this configuration. For example, molding 24 may loosen in its connection with base 12. As another example, the use of the illustrated configuration in a small form factor drive is considered to provide little opportunity to minimize the size of the overall enclosure outline of the drive, as will be further described.

In view of the foregoing, it is considered that there remains an unfulfilled need with respect to prior art disk drive enclosures. The present invention is considered to resolve the foregoing concerns while providing still further advantages.

SUMMARY OF THE DISCLOSURE

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

A disk drive housing, base assembly for use as part of the housing and associated method are disclosed. The base assembly is configured for receiving a cover. In one aspect of the disclosure, a base housing serves to define a housing interior in cooperation with the cover for receiving a plurality of components therein as part of the disk drive and the base housing includes a peripheral edge configuration. A molding surrounds and sealingly engages the base housing such that the molding defines a peripheral sealing surface for use in sealing the cover to the base assembly.

In another aspect of the disclosure, a housing is described for use in a disk drive to define a housing interior for receiving a data storage arrangement. The housing includes a first housing portion and a second housing portion. The second housing portion, usable with the first housing portion in an engaged position, defines the housing interior for receiving, a plurality of components therein which make up said disk drive and a selected one of the first housing portion and the second housing portion defines a peripheral edge configuration. A molding encases the peripheral edge configuration of the selected housing portion for supporting the molding and for sealingly engaging the peripheral edge configuration, and for defining a peripheral sealing surface for use in sealing the first housing portion to the second housing portion.

In still another aspect of the disclosure, a base assembly, for use as part of a housing in a disk drive, is configured for receiving a cover and for supporting a given layout of components in the housing. The base assembly includes a base housing that serves to define the housing interior in cooperation with the cover for receiving a plurality of components therein within a given base outline and the base housing includes a peripheral configuration having an upstanding peripheral sidewall adjoined to a peripheral flange that is transverse to the peripheral sidewall and extends outward therefrom to, but not beyond, the given base outline and wherein at least one portion of the upstanding peripheral sidewall is outset, adjacent to a given one of said components, in a way which narrows the peripheral flange for accommodating the given component within the given base outline, which given component would not otherwise be accommodated. In one feature, the given component is a disk. In another feature, opposing portions of the upstanding peripheral sidewall are outset across a particular diameter of the disk so as to accommodate the diameter of the disk within the given base outline which would not otherwise be accommodated. In still another feature, an outset region can be used for purposes of relocating a component relatively closer to the location of the outset regions such that additional space is provided within the disk drive enclosure and/or the overall outline of the enclosure can be reduced in size.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including alternatives, modifications and equivalents, as defined within the scope of the appended claims. It is noted that the drawings are not to scale and are diagrammatic in nature in a way that is thought to best illustrate features of interest. Descriptive terminology such as, for example, upper/lower, right/left, front/rear and the like has been adopted for purposes of enhancing the reader's understanding, with respect to the various views provided in the figures, and is in no way intended as being limiting.

Figure 1:
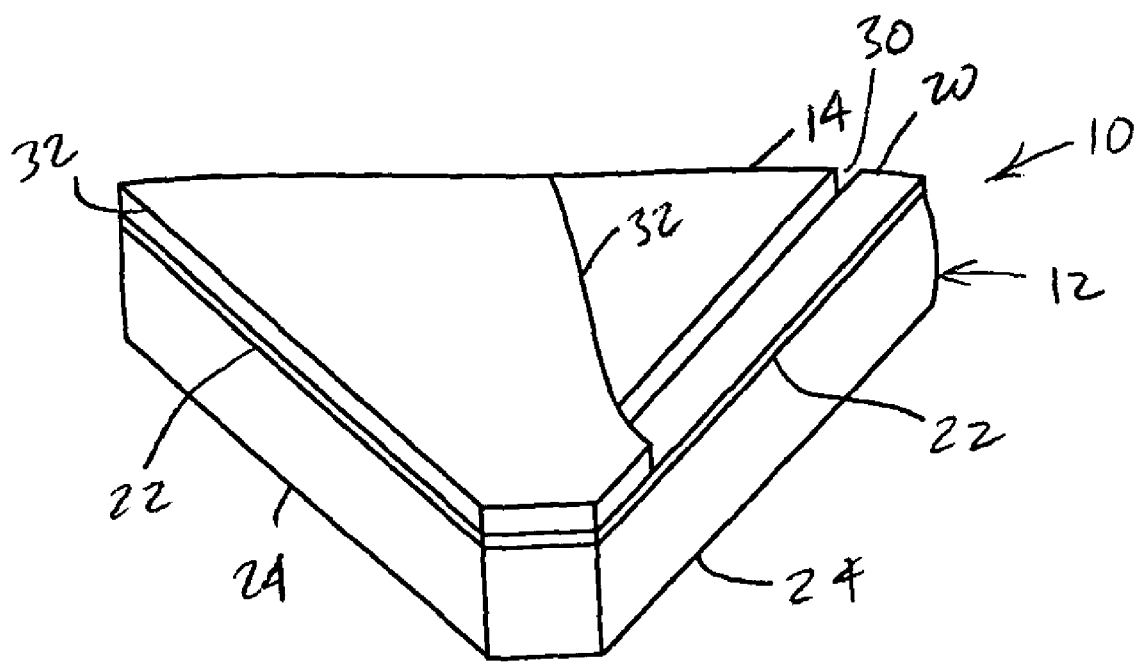
FIG. 1 is a diagrammatic, partially cut-away view, in perspective, of a prior art disk drive enclosure.
Figure 2:
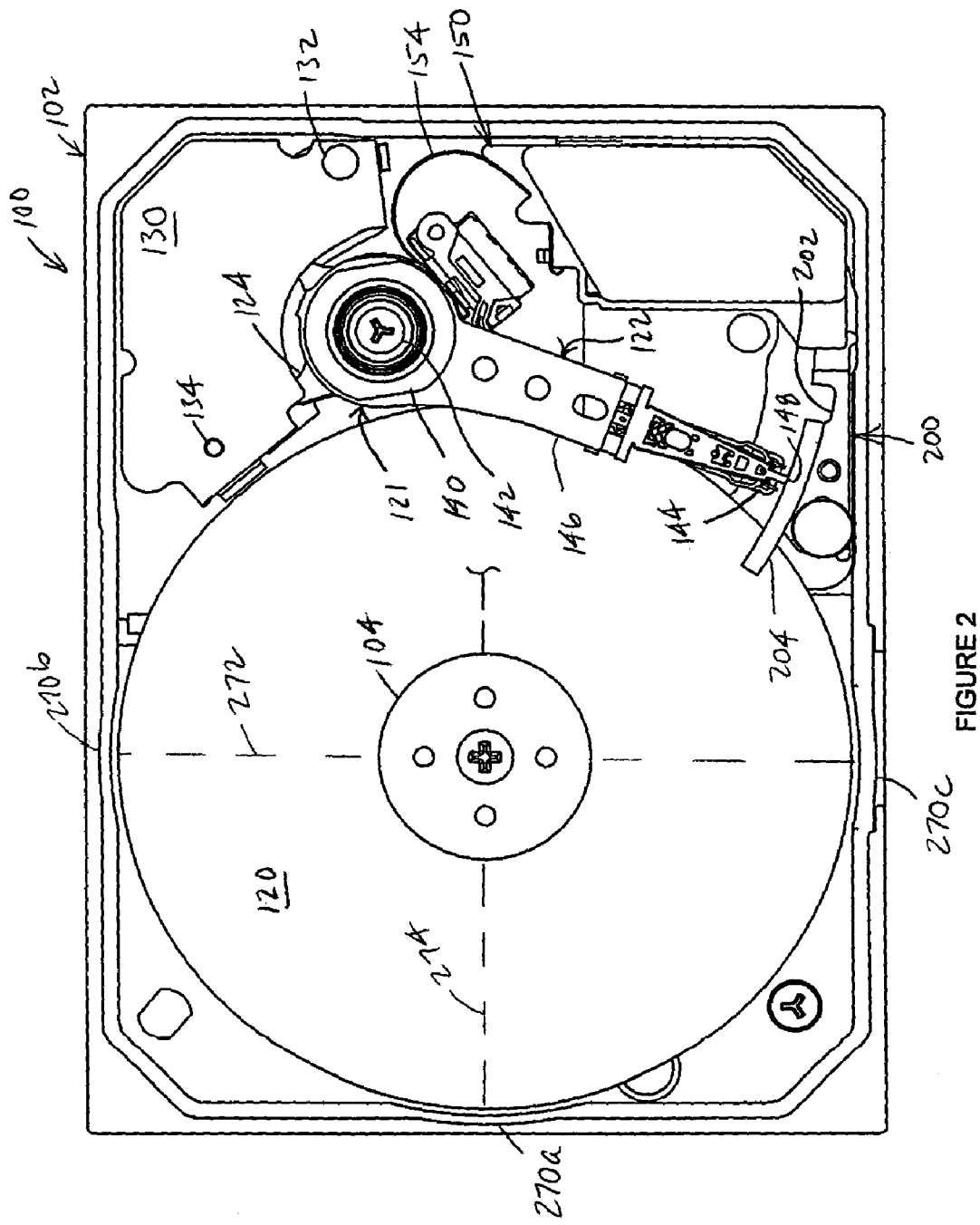
FIG. 2 is a diagrammatic plan view of a disk drive having an enclosure that is produced in accordance with the present disclosure and having the housing cover removed for purposes of illustrative clarity.

Turning now to the figures, wherein like components are designated by like reference numbers whenever practical, attention is immediately directed to FIG. 2 which diagrammatically illustrates a hard disk drive, produced in accordance with the present invention, and generally indicated by the reference number 100. While drive 100 is a miniaturized hard disk drive produced by Cornice, Inc., of Longmont, Colo., and the present invention is considered to be highly advantageous with respect to accomplishing miniaturization of hard disk drive 100, it is to be appreciated that the concepts taught herein are readily applicable with respect to any form factor and is not limited to hard disk drives.

Still referring to FIG. 2, drive 100 has been illustrated with its cover removed in order to show the various components which make up the drive. Drive 100 includes a base assembly 102, supporting a spindle motor 104 for use in rotating a disk 120. The latter includes opposing major upper and lower surfaces, each of which can be used to store digital data. A head stack assembly (HSA) 121 includes a head gimbal assembly 122 (which may be referred to hereinafter as an HGA) and a VCM end 124 having a voice coil (not visible) that is supported in a magnetic field defined by an assembly that includes a magnet (not visible), a lower return plate (not visible) and an upper return plate 130, that will be familiar to those having ordinary skill in the art. An inner diameter stop pin 132 and an outer diameter stop pin 134 serve to define rotational extents of travel of the HGA by engaging side margins of VCM end 124 at an inner diameter position and an outer diameter position, respectively, and further serve in conducting magnetic flux between the upper and lower return plates. Thus, the voice coil is supported in a magnetic field such that a controlled electric current in the voice coil can be used to selectively change the position of HGA 122. In this regard, the HSA includes a hub 140 that is pivotally supported at a pivot 142. A transducer arm arrangement extends outward from hub 140, at least generally opposite VCM end 124, to a transducer arrangement 144. In the present example, a pair of transducer arms 146 is used such that a first transducer configuration, associated with an upper one of the arms, performs data accesses using an upper surface (visible in FIG. 2) of disk 120, while a second transducer configuration, associated with a lower one of the arms, performs data accesses using a lower surface (not visible in FIG. 2) of disk 120. Generally, each transducer configuration comprises a slider which may support separate read and write transducers in a well known manner. A lift tab 148 extends from the distal end of each of the transducer arms.

With continuing reference to FIG. 2, a flexible circuit assembly 150 supports a number of integrated circuits (not shown) and further includes flex extensions for interconnecting the various electrical components within drive 100, as well as for use in externally electrically interfacing the hard disk drive. One example of the aforementioned flex extensions comprises an HGA flex extension 154. This highly advantageous HGA flex extension and associated features are described in detail in copending U.S. patent application Ser. No. 11/385,573 entitled ADVANCED MINIATURE HARD DISK DRIVE AND METHOD which is incorporated herein by reference in its entirety and is filed contemporaneously herewith. A latching arrangement, which is not visible due to the presence of upper return plate 130, can be positioned proximate to VCM end 124 of HSA 121 for use in limiting the potential of the HGA with respect to rotating from an unloaded position to a loaded position in which the transducer configurations or sliders of transducer arrangement 144 come into contact with the data surfaces of disk 120 at an undesired time such as, for example, when the disk is not rotating. It is noted that any suitable latch arrangement may be used, however, one suitable latching arrangement is described in U.S. Pat. No. 5,404,257 which describes an inertial latch configuration.

A ramp arrangement 200 is illustrated including a ramp 202. Although any suitable ramp arrangement can be used, ramp arrangement 200 is considered to be highly advantageous and is described in detail in U.S. application Ser. No. 11/385,955, now U.S. Pat. No. 7,593,192, entitled RAMP ARRANGEMENT FOR A DISK DRIVE AND METHOD, filed contemporaneously with the present application and the disclosure of which is incorporated herein by reference in its entirety. Ramp arrangement 200 defines an opposing pair of surfaces 204 (one of which is visible) for engaging lift tabs 148 to support the head arrangements in an unloaded position.

Figure 3:
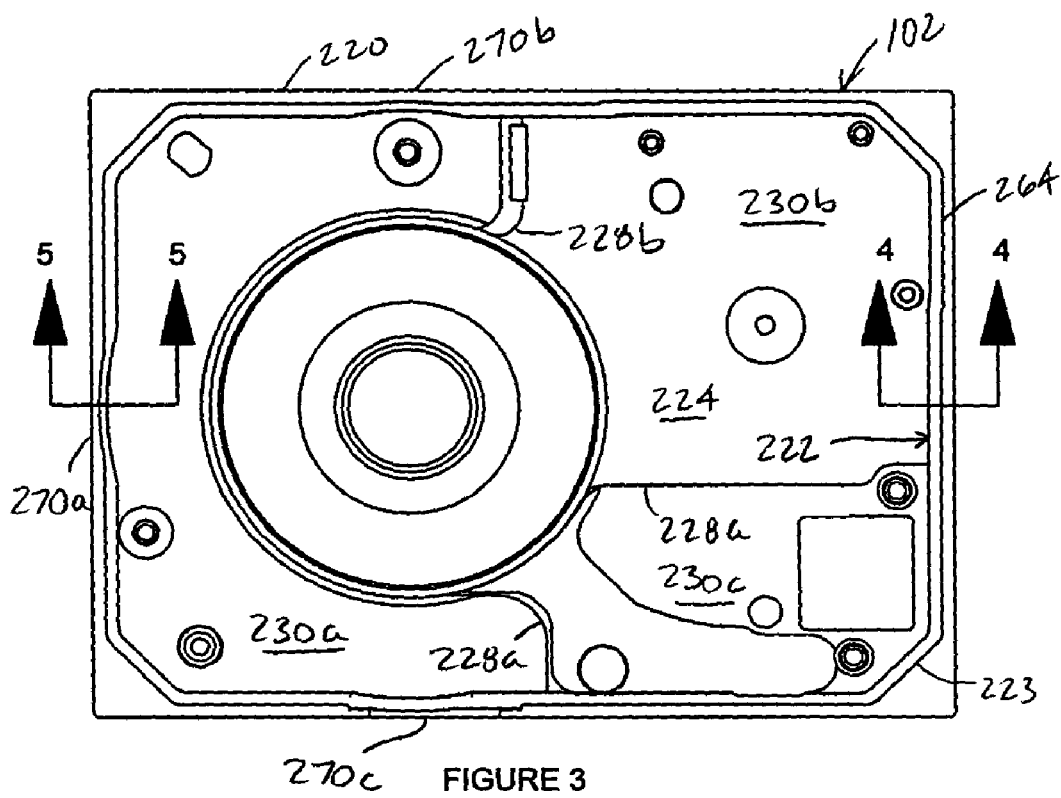
FIG. 3 is a diagrammatic plan view of a base assembly which forms part of the drive enclosure that is used in FIG. 2.

Attention is now directed to FIG. 3, in conjunction with FIG. 2, in order to describe further details with respect to the structure of base assembly 102. FIG. 3 illustrates base assembly 102 having essentially all components removed therefrom. A peripheral molding 220 surrounds a peripheral side wall configuration 222 of a base housing 223. The peripheral sidewall configuration of base housing 223 surrounds a base pan 224 that delimits the lateral extents of the interior of base housing 223. Base pan 124 can be considered as at least generally defining a major surface or plane of the base assembly that is delimited by its peripheral sidewall configuration. It is noted that base pan 224 includes regions of different relative heights that are separated by steps 228a-c. Thus, base pan 224 includes three general surface regions 230a-c that are of progressively lower height in the view of FIG. 3, as will be further described.

Figures 4, 5:
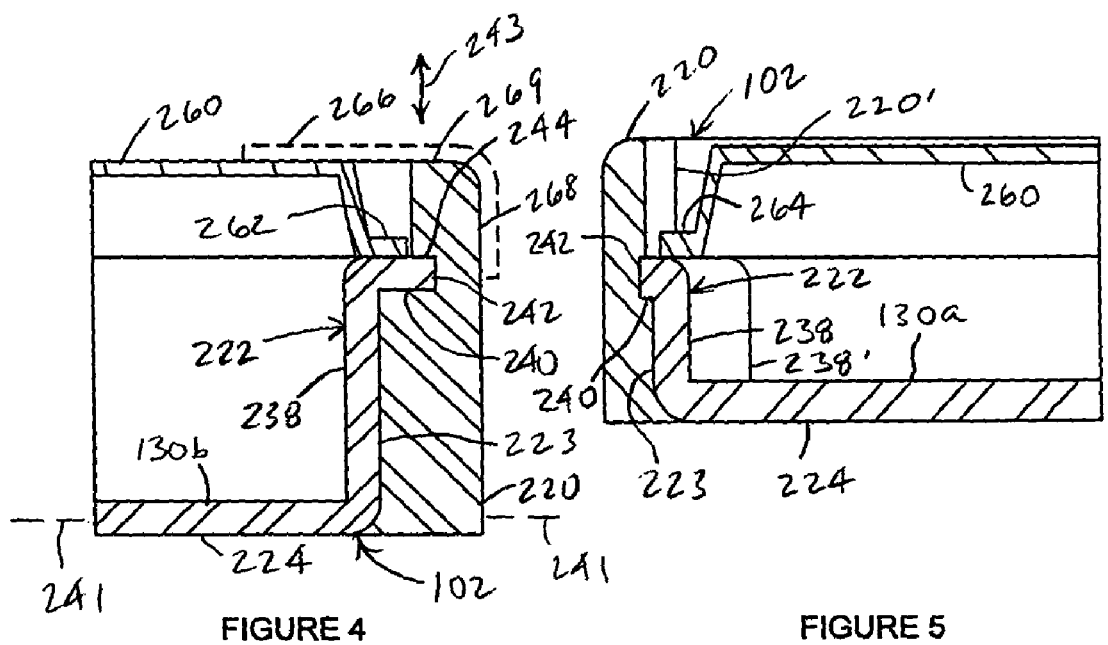
FIG. 4 is a diagrammatic elevational view, in cross-section, taken generally along a line 4-4 in FIG. 3, shown here to illustrate details with respect to a sidewall configuration of the base assembly of the enclosure that is shown in FIG. 3.
FIG. 5 is a diagrammatic elevational view, in cross-section, taken generally along a line 5-5 in FIG. 3, shown here to illustrate further details with respect to an outset region of the sidewall configuration of the base assembly of the enclosure that is shown in FIG. 3.

Referring to FIGS. 3-5, FIG. 4 is a partial, diagrammatic cross-sectional view, in elevation, taken generally along a line 4-4 in FIG. 3 so as to illustrate one particular configuration of the peripheral sidewall of base assembly 102, while FIG. 5 is a partial, diagrammatic cross-sectional view, in elevation, taken generally along a line 5-5 in FIG. 3 so as to illustrate another particular configuration of the peripheral sidewall of base assembly 102. Peripheral sidewall configuration 222 generally includes an upstanding peripheral sidewall 238 which supports a peripheral flange 240 that extends or projects transversely outward therefrom and can be substantially orthogonal with respect to peripheral upstanding sidewall 238. The latter can itself be at least generally normal to a plane 241 (shown as a dashed line in FIG. 4) that is generally defined by base pan 224, although this is not a requirement. Plane 241 is at least generally parallel to surfaces 230 of pan 224. Base housing 223 can be formed in any suitable manner. For example, if formed using a metal: stamping, machining or any suitable combination of such techniques can be used. Thus, the various portions of base housing 223 can be integrally or separately formed. Aforementioned molding 220 surrounds peripheral sidewall configuration 222 of base housing 223 and encases or encapsulates at least a peripheral edge configuration 242 of flange 240, as is best illustrated in FIG. 4. The peripheral edge configuration includes the end surface of flange 240 and portions of the opposing, major surfaces of the flange. This configuration essentially forms a seal, between molding 220 and base housing 223, that effectively prevents contamination from entering the disk drive enclosure by passing between the molding and base housing. Any suitable molding technique and molding material may be used so long as this seal is formed and maintained over the contemplated lifetime of the disk drive. Suitable molding techniques include, but are not limited to injection molding, as will be appreciated by those having ordinary skill in the art in view of this overall disclosure. Suitable molding materials include, but are not limited to thermoplastic engineering resins. In this regard, suitable materials for forming base housing 223 should satisfy requirements for being shaped into the desired configuration as well as maintaining an appropriate bond with the molding material. In the instance of stamping, suitable materials for the base housing include, but are not limited to cold rolled steel and stainless steel sheet stock, as will be appreciated by those having ordinary skill in the art in view of this overall disclosure.

Still referring to FIGS. 3-5, it should be appreciated that encapsulation of peripheral edge configuration 242 of flange 240 provides a cleating feature that is advantageous with respect to maintaining molding 220 in a desired position on base housing 223. In the present implementation, the application of a given force, applied to molding 220 in any direction that is transverse to the major surface or plane of base assembly 102, urges at least part of the molding toward the encased portion of flange 242 so as to cleat the molding on base housing 223. That is, the applied force includes a force component 243 that is normal to an upper surface 244 of flange 240. Further, the cleating configuration serves to assist in the formation of a suitable seal between molding 220 and base housing 223 by extending the length of the sealing path and providing a more intricate shape for the sealing path.

Figure 6:
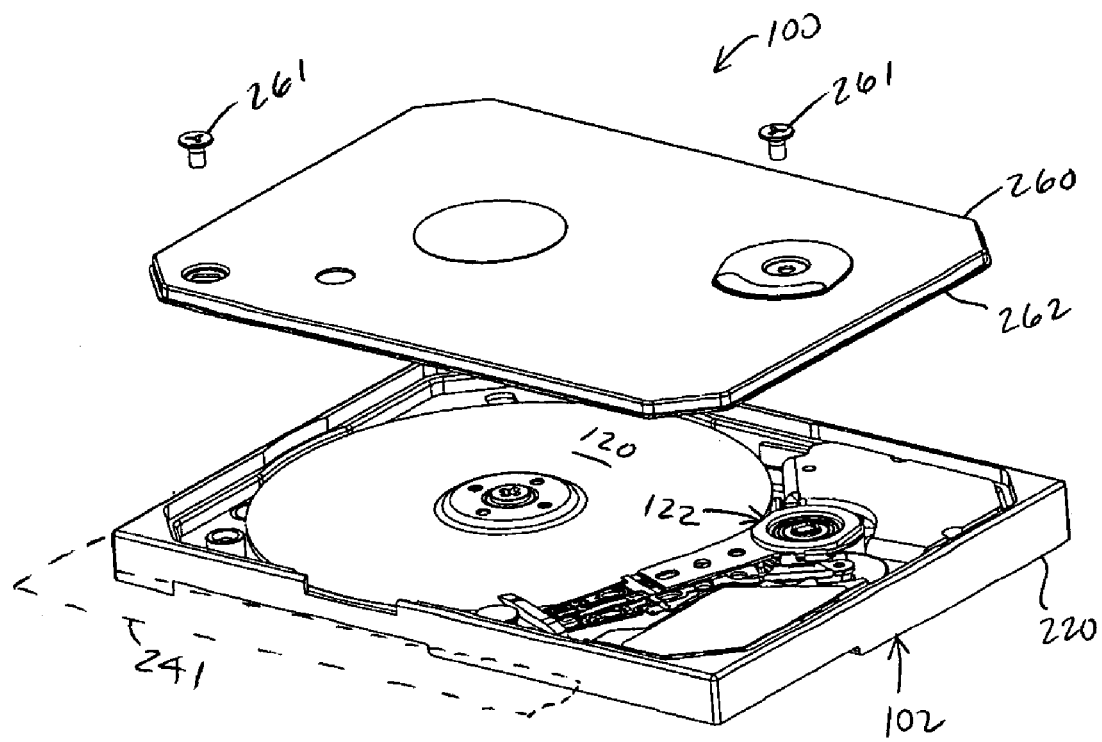
FIG. 6 is a diagrammatic perspective view of one embodiment of a disk drive, using the base of FIGS. 2-5, and further illustrating a cover in a spaced apart relationship with the base.
Figure 7:
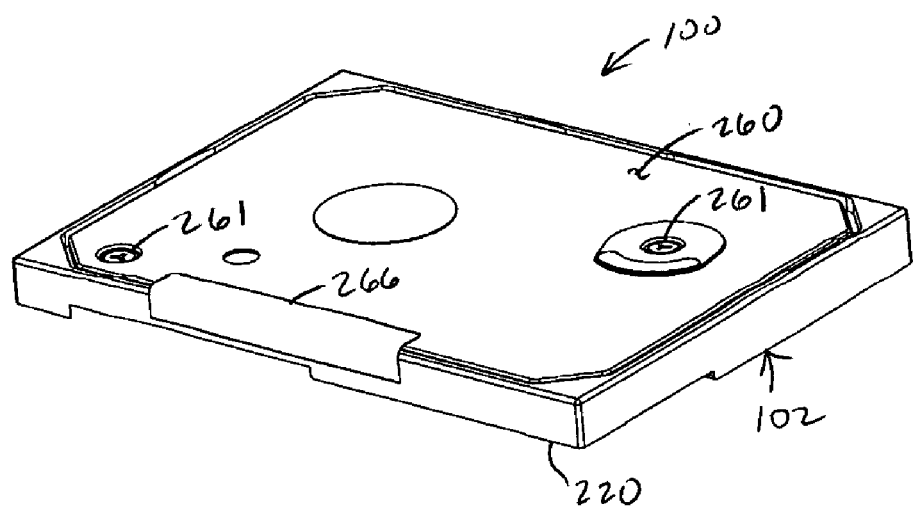
FIG. 7 is a diagrammatic perspective view of the embodiment of FIG. 6, showing the cover installed on the base.

Referring to FIGS. 6 and 7, the former illustrates base assembly 102, including the components of FIG. 2 installed therein, in a diagrammatic perspective view with the base assembly in a spaced apart relationship with a cover 260. FIG. 7 is a diagrammatic perspective view which illustrates cover 260 installed on base assembly 102 and partially shows plane 241 to illustrate its orientation. Any suitable mechanism may be used to hold the cover on the base assembly. In the present example, a pair of fasteners 261 is used. In another embodiment, fasteners may not be required, if sealing tape is used to seal the cover to the base assembly.

FIG. 4 illustrates details with respect to the manner in which cover 260 is installed on base assembly 102. Cover 260 includes a peripheral rim 262 which seats against upper surface 244 of flange 240, serving as a seat for cover 260 and thereby supporting the cover, while molding 220 serves to center cover 260 onto base assembly 102. Sealing the gap formed between the cover portion and base assembly can be accomplished, for example, by applying a sealing tape 266 (illustrated using a dashed line in FIG. 4 and partially shown in FIG. 7) so as to contact a peripheral portion of the upper surface of cover 260, bridge the gap, and extend around the peripheral corner of molding 220 so as to sealingly engage a portion 268 of the outer peripheral surface of the molding, as well as contacting an upper peripheral region 269 of the molding, although sealing against upper region 269 may not be needed, or some sealing implementations may feature a combination of the use of upper region 269 and peripheral surface 268 to form an overall seal. It should be appreciated that cover 260 is not required to include rim 262 and that other cover configurations may be used, while continuing to apply the teachings that have been brought to light herein. For example, the cover could be formed from a planar sheet material with no out-of-plane features. In this regard, the cover rim serves in enhancing the rigidity of the overall cover for reasons that will be made evident below. Further, it is not a requirement for the sealing tape to extend around the corner of the disk drive peripheral outline, however, this configuration does provide generally for sealing against a relatively broad peripheral sidewall surface, irrespective of changes in the width or configuration of upper surface region 269 of molding 220 which, in the present example, is generally parallel to the upper surface of cover 260. While the upper surface of cover 260 and peripheral outer surface 268 of molding 220 are shown in the present example as being at least generally normal with respect to one another, this is not a requirement. That is, outer sealing surface 268 of molding 220 can form a non-orthogonal angle with the upper surface of cover 260.

Turning again to FIGS. 3-5, the view of the latter figure is representative of regions 270a-c of the peripheral sidewall configuration in which upstanding peripheral sidewall 238 is displaced outward or outset, as seen in FIGS. 3 and 5, with respect to the general configuration of the peripheral sidewall, as seen in FIG. 4. Therefore, as shown in FIG. 5, flange 242 is narrowed in outset regions 270a-c, which may be referred to collectively as outset regions 270. The peripheral sidewall and molding in an adjoining region, beyond the outset region, are visible in the view of FIG. 5 and indicated as 238' and 220', respectively. The use of the outset regions is advantageous with respect to accommodating disk 120 within base housing 223. In particular, FIG. 2 illustrates that outset regions 270b and 270c are arranged at opposing positions across a particular diameter 272 of disk 120, while outset region 270a is arranged along an orthogonal diameter 274. The outset regions effectively provide for a reduction in the size of the overall peripheral outline of disk drive 100 for a given disk diameter. That is, for a given base outline of base housing 223, a peripheral configuration having an upstanding or transverse peripheral sidewall is adjoined to a peripheral flange that is transverse to the peripheral sidewall and extends outward therefrom to, but not beyond, the given base outline. At least one portion of the upstanding peripheral sidewall is outset, adjacent to a given one of the internal components of the drive, in a way which narrows the peripheral flange for accommodating the given component within the given base outline, which given component would not otherwise be accommodated. That is, the base housing, by outsetting the peripheral sidewall, can accommodate the given component within an unmodified base housing outline which, in the present example, is defined in the region of interest by the outer edge of peripheral flange 242. In terms of a disk, a given base housing is able to accommodate a disk that can be relatively larger when one or both of the outset regions are used across particular diameter 272. The use of outset region 270a provides additional interior enclosure space, as is seen in FIG. 2, by allowing the rotational center of the disk to shift toward the peripheral sidewall at the location of the outset. Moreover, the use of such outset regions is not confined to the periphery of disk 120, but may be used adjacent to any component to provide an additional clearance margin. The use of outset regions 270 adjacent to disk 120 is advantageous, however, since the lateral extents of the disk represent the largest physical component that is located within the drive housing.

Still considering outset regions 270, molding 220 effectively bridges these regions while still sealing against base housing 223 and providing a continuous sealing surface around the periphery of the drive. Comparison of FIGS. 4 and 5 reveals that the molding has less purchase on flange 240 in the outset region and, in fact, the configuration in the outset region may be out of tolerance or specification with respect to what would be defined as acceptable or best practice if the configuration of the outset region were applied in a broader width or around the entire periphery of the drive. Further, the molding is relatively laterally thin in the outset regions. The adjoining regions, however, having the configuration of FIG. 4, provide appropriate bridging support for the outset regions. In this regard, the width of the outset regions, as well as the amount of outset, can be adjusted in view of characteristics of the cover and/or in view of constraints imposed by the molding material, in conjunction with the specific dimensions being considered for a particular implementation. These adjustments are considered to be within the capability of one having ordinary skill in the art in view of this overall disclosure.

Although each of the aforedescribed physical embodiments have been illustrated with various components having particular respective orientations, it should be understood that the present invention may take on a variety of specific configurations with the various components being located in a wide variety of positions and mutual orientations. Furthermore, the methods described herein may be modified in an unlimited number of ways, for example, by reordering the various sequences of which they are made up. Accordingly, having described a number of exemplary aspects and embodiments above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a disk drive, a housing including a base assembly that is configured for receiving a cover, said base assembly comprising:
   a base housing serving to define a housing interior in cooperation with said cover for receiving a plurality of components therein as part of said disk drive, the base housing further including a surface defining a plane, the surface configured to support at least one of the plurality of components, wherein said base housing includes a peripheral edge configuration; and
   a molding which surrounds and sealingly engages the base housing such that the molding defines a peripheral sealing surface for use in sealing the cover to the base assembly;
   wherein the base housing defines a peripheral sidewall which at least generally delimits the surface of the base housing and said peripheral sidewall includes a first, upstanding portion that extends transversely from the surface of the base housing to a peripheral flange that extends transversely and outwardly from said first, upstanding portion to said peripheral edge configuration; and
   wherein the peripheral edge configuration is encapsulated in the molding.

2. The assembly of claim 1 wherein said molding is configured to receive the cover on the base housing in a way which aligns the cover thereon.

3. The assembly of claim 2, further comprising a sealing tape adhered to the cover and the molding.

4. A method for producing a base assembly, for use as part of a housing in a disk drive, said housing including a cover that is receivable by the base assembly, said method comprising:
   configuring a base housing to define a housing interior in cooperation with said cover for receiving a plurality of components therein as part of said disk drive, the base housing further including a surface defining a plane, the surface configured to support at least one of the plurality of components; wherein the base housing defines a peripheral sidewall which at least generally delimits the surface of the base housing and said peripheral sidewall includes a first, upstanding portion that extends transversely from the surface of the base housing to a peripheral flange that extends transversely and outwardly from said first, upstanding portion to said peripheral edge configuration; and
   applying a molding to surround and sealingly engage the base housing by encapsulating a portion of the peripheral flange such that the molding defines a peripheral sealing surface for use in sealing the cover to the base assembly.

5. The method of claim 4 further comprising:
   placing a cover over the base housing engaging the peripheral flange and received by the molding; and
   applying a sealing tape engaging both the cover and the molding.

6. A housing for use in a disk drive to define a housing interior for receiving a data storage arrangement, said housing comprising:
- a first housing portion;
- a second housing portion, usable with said first housing portion in an engaged position, so as to define a housing interior for receiving a plurality of components therein which make up said disk drive and wherein said second housing portion defines a peripheral edge configuration, said second housing portion further including a surface defining a plane; the surface configured to support at least one of the plurality of components; and
- a molding which encapsulates said peripheral edge configuration of the selected housing portion for supporting the molding and for sealingly engaging the peripheral edge configuration, and for defining a peripheral sealing surface for use in sealing the first housing portion to the second housing portion, wherein the second housing portion defines a peripheral sidewall which at least generally delimits a surface of the base housing and said peripheral sidewall includes a first, upstanding portion that extends transversely from a surface of the first housing portion to a peripheral flange that extends transversely and outwardly from said first, upstanding portion to said peripheral edge configuration.

7. The housing of claim 6 wherein said peripheral sealing surface is formed as a continuous surface surrounding the selected one of the first housing portion and the second housing portion.

8. The housing of claim 6 wherein said first housing portion and said second housing portion at least generally define a major plane of the disk drive in said engaged position and wherein said peripheral sealing surface is transverse to said major plane.

9. The housing of claim 6 wherein said peripheral sidewall configuration is configured to cooperate with said molding such that, for a given force, that is applied in a direction that is transverse to a plane that is at least generally defined by said lateral extents, at least part of the molding is urged toward the encapsulated portion of the peripheral edge configuration, whereby to cleat the molding thereto.

10. The housing of claim 9 wherein said peripheral sidewall configuration includes a first portion which extends transverse from the lateral extents to a peripheral flange that is at least generally parallel with said plane such that the peripheral edge configuration is defined by said peripheral flange.

11. A method for producing a housing for use in a disk drive so as to define a housing interior for receiving a data storage arrangement, said method comprising:
- configuring a first housing portion;
- arranging a second housing portion, for use with said first housing portion in an engaged position, so as to define a housing interior in cooperation with the first housing portion in said engaged position, for receiving a plurality of components therein which make up said disk drive and wherein a selected one of said first housing portion and said second housing portion defines a peripheral edge configuration; and
- applying a molding to encapsulate at least the peripheral edge configuration for sealingly engaging the selected housing portion and for support thereagainst and for defining a peripheral sealing surface for use in sealing the first housing portion to the second housing portion;
- wherein the selected one of the housing portions defines a peripheral sidewall which at least generally delimits a major surface of the selected housing portion and said peripheral sidewall includes a first, upstanding portion that extends transversely from the major surface of the selected housing portion to a peripheral flange that extends transversely and outwardly from said first upstanding portion to said peripheral edge configuration.

12. The method of claim 11 wherein said molding is applied so as to completely surround the selected one of the first housing portion and the second housing portion.

13. The method of claim 12 including forming said peripheral sealing surface as a continuous surface surrounding the selected one of the first housing portion and the second housing portion.

14. The method of claim 11 wherein said first housing portion and said second housing portion at least generally define a major plane of the disk drive in said engaged position and wherein said peripheral sealing surface is transverse to said major plane.

15. The method of claim 11, further comprising configuring said peripheral sidewall configuration to cooperate with said molding such that, for a given force, that is applied in a direction that is transverse to a plane that is at least generally defined by said lateral extents, at least part of the molding is urged toward the encased portion of the peripheral edge configuration, whereby to cleat the molding thereto.

16. The method of claim, 15 wherein said peripheral flange is at least generally parallel with said plane.

17. A housing for housing a disk drive comprising:
- a base assembly that is configured for receiving a cover and for supporting a given layout of components in the housing, said base assembly comprising a base housing serving to define said housing interior in cooperation with said cover for receiving a plurality of components therein within a given base outline and said base housing including a peripheral configuration having an upstanding peripheral sidewall adjoined to a peripheral flange that is transverse to said peripheral sidewall and extends outward therefrom to, but not beyond, said given base outline and wherein at least one portion of said upstanding peripheral sidewall is outset, adjacent to a given one of said components, in a way which narrows said peripheral flange for accommodating said given component within the given base outline, which given component would not otherwise be accommodated; and
- a molding which surrounds and sealingly engages the base housing such that the molding defines a peripheral sealing surface for use in sealing the cover to the base assembly, a portion of the peripheral flange being encapsulated in the molding.

18. The assembly of claim 17 wherein said given component is a disk which is supported for rotation in the housing for use in performing data accesses.

19. The assembly of claim 18 wherein said disk includes a diameter such that a pair of opposing points directly opposite one another across a particular diameter of said disk are adjacent to the upstanding peripheral sidewall so that two opposing portions of said upstanding peripheral sidewall are outset proximate to the particular diameter to narrow the flange proximate to said opposing portions of the upstanding peripheral sidewall so as to accommodate the diameter of said disk within the given base outline, which diameter would not otherwise be accommodated.

20. The assembly of claim 19 wherein at least one additional point on an additional diameter of said disk is adjacent to the upstanding peripheral sidewall such that an additional portion of said upstanding peripheral sidewall is outset proximate to the additional diameter to narrow the flange proximate to said additional portion of the upstanding peripheral sidewall while remaining within the given base outline.

21. The assembly of claim 20 wherein said additional diameter is at least generally orthogonal with respect to said particular diameter.

22. A method for producing comprising:
configuring a base housing to define said housing interior, in cooperation with a cover, for receiving a plurality of components therein within a given base outline and said base housing including a peripheral configuration having an upstanding peripheral sidewall adjoined to a peripheral flange that is transverse to said peripheral sidewall and extends outward therefrom to, but not beyond, said given base outline; and
outsetting at least one portion of said upstanding peripheral sidewall, adjacent to a given one of said components, to narrow said peripheral flange for accommodating said given component within the given base outline, which given component would not otherwise be accommodated; and
encapsulating a portion of the peripheral flange in a molding which surrounds and sealingly engages the base housing such that the molding defines a peripheral sealing surface for use in sealing the cover to the base housing.

23. The method of claim 22 wherein said given component is a disk which is supported for rotation in the housing for use in performing data accesses.

24. The method of claim 23 wherein said disk includes a diameter such that a pair of opposing points directly opposite one another across a particular diameter of said disk are adjacent to the upstanding peripheral sidewall so that two opposing portions of said upstanding peripheral sidewall are proximate to the particular diameter and said outsetting outsets the opposing portions of the peripheral sidewall to narrow the flange proximate thereto so as to accommodate the diameter of said disk within the given base outline, which diameter would not otherwise be accommodated.

25. The method of claim 24 wherein at least one additional point on an additional diameter of said disk is adjacent to the upstanding peripheral sidewall and outsetting outsets the peripheral sidewall proximate to a point adjacent to said additional diameter and narrows a further additional portion of said flange proximate to the additional diameter.

26. The method of claim 25 wherein said additional diameter is at least generally orthogonal with respect to said particular diameter.

* * * * *

UNITED STATES PATENT AND TRADEMARK OFFICE
CERTIFICATE OF CORRECTION

| | | |
|---|---|---|
| PATENT NO. | : 7,821,735 B1 | Page 1 of 1 |
| APPLICATION NO. | : 11/385574 | |
| DATED | : October 26, 2010 | |
| INVENTOR(S) | : Bogacz et al. | |

It is certified that error appears in the above-identified patent and that said Letters Patent is hereby corrected as shown below:

<u>Column 10</u>
Line 25, delete "claim, 15" and insert --claim 15--

<u>Column 11</u>
Line 6, after "producing", insert --a housing in a disk--

Signed and Sealed this
Twenty-sixth Day of April, 2011

David J. Kappos
*Director of the United States Patent and Trademark Office*